(12) United States Patent
Jameson

(10) Patent No.: US 12,096,868 B2
(45) Date of Patent: Sep. 24, 2024

(54) HOLDING APPARATUS WITH FOLDABLE TRIFOLD STRUCTURE

(71) Applicant: Dementia Society of America, Doylestown, PA (US)

(72) Inventor: Kevin William Jameson, Doylestown, PA (US)

(73) Assignee: Dementia Society of America, Doylestown, PA (US)

( * ) Notice: Subject to any disclaimer, the term of this patent is extended or adjusted under 35 U.S.C. 154(b) by 0 days.

(21) Appl. No.: 18/141,828

(22) Filed: May 1, 2023

(65) Prior Publication Data

US 2023/0346141 A1   Nov. 2, 2023

Related U.S. Application Data

(60) Provisional application No. 63/336,654, filed on Apr. 29, 2022.

(51) Int. Cl.
*A47F 5/11* (2006.01)
*A47B 23/04* (2006.01)
(Continued)

(52) U.S. Cl.
CPC ............. *A47F 5/11* (2013.01); *A47F 7/0042* (2013.01); *A47B 23/044* (2013.01); *B42D 15/04* (2013.01);
(Continued)

(58) Field of Classification Search
CPC .. A47F 5/10; A47F 5/11; A47F 7/0042; G09F 23/10; A47B 23/04; A47B 97/04;
(Continued)

(56) References Cited

U.S. PATENT DOCUMENTS 1,819,814 A * 8/1931 Hansen .................... A47F 5/108
248/463
2,726,835 A * 12/1955 Hummel ................ A47F 5/112
248/459

(Continued)

FOREIGN PATENT DOCUMENTS

| CN | 2487678 Y | * | 4/2002 |
| CN | 106247119 A | * | 12/2016 |
| JP | 2015076870 A | * | 4/2015 |

*Primary Examiner* — Tan Le

(74) *Attorney, Agent, or Firm* — Fish & Richardson P.C.

(57) ABSTRACT

An apparatus having a flat foldable trifold structure is disclosed for holding printed materials, including mailable literature. In some implementations, the apparatus includes a foldable body having a first and second portion. The first portion is folded along a lateral axis of the foldable body. The first portion has a rectangular region defined by four points and four boundaries, where three of the boundaries define incisions in the first portion such that the remaining boundary is permitted to be folded relative to a remaining area of the first portion to define a second fold extending along the lateral axis. The second portion includes a base region and a protruding region which is folded relative to the base region to define a third fold extending along the lateral axis. When the first boundary is folded relative to the remaining area of the first portion, the third fold receives an end defined by the remaining boundary.

9 Claims, 4 Drawing Sheets

(51) Int. Cl.
  *A47F 7/00* (2006.01)
  *F16M 11/38* (2006.01)
  *B42D 15/04* (2006.01)
  *F16M 11/10* (2006.01)
  *G09F 23/10* (2006.01)

(52) U.S. Cl.
  CPC .............. *F16M 11/10* (2013.01); *F16M 11/38* (2013.01); *G09F 23/10* (2013.01)

(58) Field of Classification Search
  CPC .... A47B 97/08; A47B 23/044; B42D 15/042; B42D 15/22; F16M 11/38; F16M 11/10
  See application file for complete search history.

(56) References Cited

U.S. PATENT DOCUMENTS

| | | | | |
|---|---|---|---|---|
| 4,674,724 A * | 6/1987 | Gaudet | ................ | A47B 23/044 |
| | | | | 248/459 |
| 6,557,897 B1 * | 5/2003 | Gaudet | ................ | A47B 23/044 |
| | | | | 248/455 |
| 9,308,767 B1 * | 4/2016 | Waldron | ............. | B42D 15/042 |
| 2015/0192244 A1 * | 7/2015 | Haarburger | ............ | F16M 13/00 |
| | | | | 248/459 |

* cited by examiner

HOLDING APPARATUS WITH FOLDABLE TRIFOLD STRUCTURE

CROSS-REFERENCE TO RELATED APPLICATIONS

This application claims the benefit of priority to U.S. Provisional Patent Application No. 63/336,654, filed on Apr. 29, 2022, the contents of which are incorporated by reference herein.

FIELD

This disclosure generally relates to the field of holding apparatuses, and in particular, to a holding apparatus for printed material.

BACKGROUND

Devices or systems can be used to produce and distribute printed materials, such as physical mail, including letters, flyers, and brochures. Devices used to manufacturer such material include printing presses, mailing machines, envelope stuffing machines, and postal sorting systems. For example, a printing press may be used to print flyers, brochures, and other advertising materials in large quantities. Envelope stuffing machines may be used to fold and insert advertising materials, such as flyers or brochures, into envelopes at high speed. Mailing machines may be used to print addresses, postage, and other information directly onto envelopes, postcards, or other mailing materials. The objective of these apparatuses is to help advertisers efficiently and effectively distribute their advertising materials to the right audiences, at the right time, and in the right format.

SUMMARY

This disclosure relates an apparatus having a foldable body with a trifold structure for holding printed mail, such as mailable literature (e.g., "rack card" printed material). The foldable body can be constructed to be low cost and lightweight. The structure can also have stability and be printable and mailable in a standard-sized envelope, and easily assembled with minimal to no instruction. In some implementations, the body is durable and sized to be large enough to hold sufficient material for public distribution and not flip or be knocked over (e.g., top-heavy when fitted with materials).

In some implementations, the body of the apparatus can be printed using single or multi-color techniques. In some instances, the body can have messaging viewable from front and rear views. In a flat/unfolded form, the body can be configured to fit alongside standard letterhead sheet stock in a regular envelope with no protrusions, bump-outs, or sharp edges. In some instances, the body can be designed to be constructed to be friendly for Environmental, Social, and Governance (ESG) criteria. The body disclosed herein provides advantages over other types of structures, which sometimes requires more costly non-renewable materials, may not lay completely flat, and are so constructed as to have limited printable surface area unless they are made with more complexity and use more raw materials to gain additional surface area with added cost.

In one general aspect, an apparatus is described for retaining printed material. The apparatus includes a foldable body having a first portion and a second portion. The first portion is configured to be folded relative to the second portion to define a first fold extending along a lateral axis of the foldable body. The first portion has a least a rectangular region having an area defined by four points within the first portion. A first boundary of the rectangular region extends from a first point to a second point, a second boundary extends from the second point to a third point, a third boundary extends from third second point to a fourth point, and a fourth boundary extends from fourth second point to the fourth point. The second boundary, third boundary, and the fourth boundary are each configured to define incisions in the first portion such that the first boundary is permitted to be folded relative to a remaining area of the first portion to define a second fold extending along the lateral axis. The second portion has a least a base region and a protruding region. The protruding region is folded relative to the base region to define a third fold extending along the lateral axis. In some instances, when the first boundary is folded relative to the remaining area of the first portion, the third fold is configured to receive an end defined by the first boundary and thereby provide a recess in the first portion corresponding to the area of the rectangular region.

One or more implementations may include the following optional features. For example, in some implementations, the protruding region extends in a first longitudinal axis. The base region extends in a second longitudinal axis, and the first longitudinal axis is perpendicular to the second longitudinal axis. The first longitudinal axis and the second longitudinal axis are each perpendicular to the lateral axis.

In some implementations, the apparatus is constructed from cardboard paper.

In some implementations, the apparatus is sized to have a width of 8.5 inches and a length of 11 inches.

In some implementations, the apparatus is sized such that a length of the first portion is 6 inches and a width of the first portion is 8.5 inches. Additionally, a length of the second portion is 5 inches and a width of the first portion is 8.5 inches.

In some implementations, the apparatus is sized such that a length of the protruding region is 1 inch and the width of the protruding region is 8.5 inches.

In some implementations, the rectangular region such that the first boundary and the third boundary have a length of 4.125 inches. Additionally, the second boundary and the fourth boundary have a length of 4 inches.

In some implementations, the apparatus is configured to hold the printed material by holding the printing material in the recess.

In some implementations, when the first boundary is folded relative to the remaining area of the first portion, the third fold is configured to be affixed to the end defined by the first boundary.

DESCRIPTION OF DRAWINGS

In the drawings, like reference numbers represent corresponding parts throughout.

DETAILED DESCRIPTION

Figure 1:
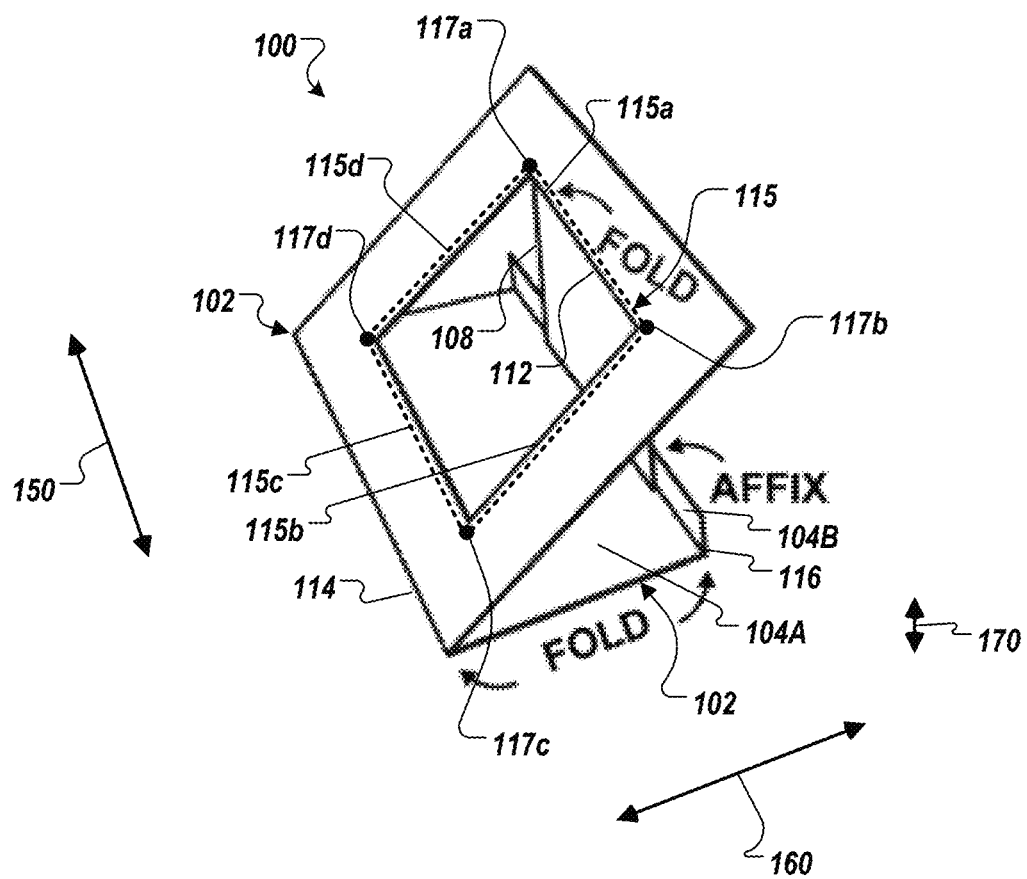
FIG. 1 illustrates an example of a perspective view of an apparatus with a foldable body with a trifold structure.

FIG. 1 illustrates an example of a perspective view of an apparatus 100 with a foldable body with a trifold structure.

The body of the apparatus 100 generally includes a first portion 102 and a second portion 104. The first portion 102 and second portion 104 portions are established through a first fold 112 that permits movement of the first portion 102 and second portion 104 portions relative to one another along a lateral axis 150. In some examples, this movement allows the second portion 104 to function as a base so that apparatus 100 can be placed on a flat surface, for example, a table or counter.

The first portion 102 includes a rectangular region 108 defined by a first boundary 115a, a second boundary 115b, a third boundary 115c, and a fourth boundary 115d. Boundaries 115a, 115b, 115c, and 115d are formed between a first point 117a, a second point 117b, a third point 117c, and a fourth point 117d, respectively. Boundaries 115b, 115c, 115d may define incisions that separate the rectangular region 108 from the first portion 102 and thereby provide a recess 115. In some examples, these three incisions area are created along the boundaries 115b, 115c, and 115d via a first fold 112. In this example, the first boundary 115a defines fold 112 that permits movement of the rectangular region 108 relative to the remaining area of the first portion 102. Other examples may use different boundary naming conventions, or may define more than four boundaries. In other implementations, the rectangular region 108 and the recess 115 may have other shapes, such as a triangular shape, a hexagonal shape, among others.

The second portion 104 includes a base region 104A and a protruding region 104B. The second portion 104 is formed using a second fold 114 relative to the first portion 102. In some examples, when the first boundary 115a and rectangular region 108 is folded relative to the remaining area of the first portion 102, a third fold 116 is configured to be affixed to the end of the rectangular region 108. In some examples, the third fold 116 allows the protruding region 104B to be folded relative to the base region 104A and be positioned such it prevents further rotation of the rectangular region 108 about the third fold 116, thus providing rigidity for apparatus 100 when assembled. In some examples, the base region 104A extends in a longitudinal axis 160 and the protruding region 104B extends in a longitudinal axis 170, where the longitudinal axis 160 is perpendicular to the longitudinal axis 170. In this example, the longitudinal axis 160 and the longitudinal axis 170 are each perpendicular to the lateral axis 150 of the first portion 102.

Figure 2:
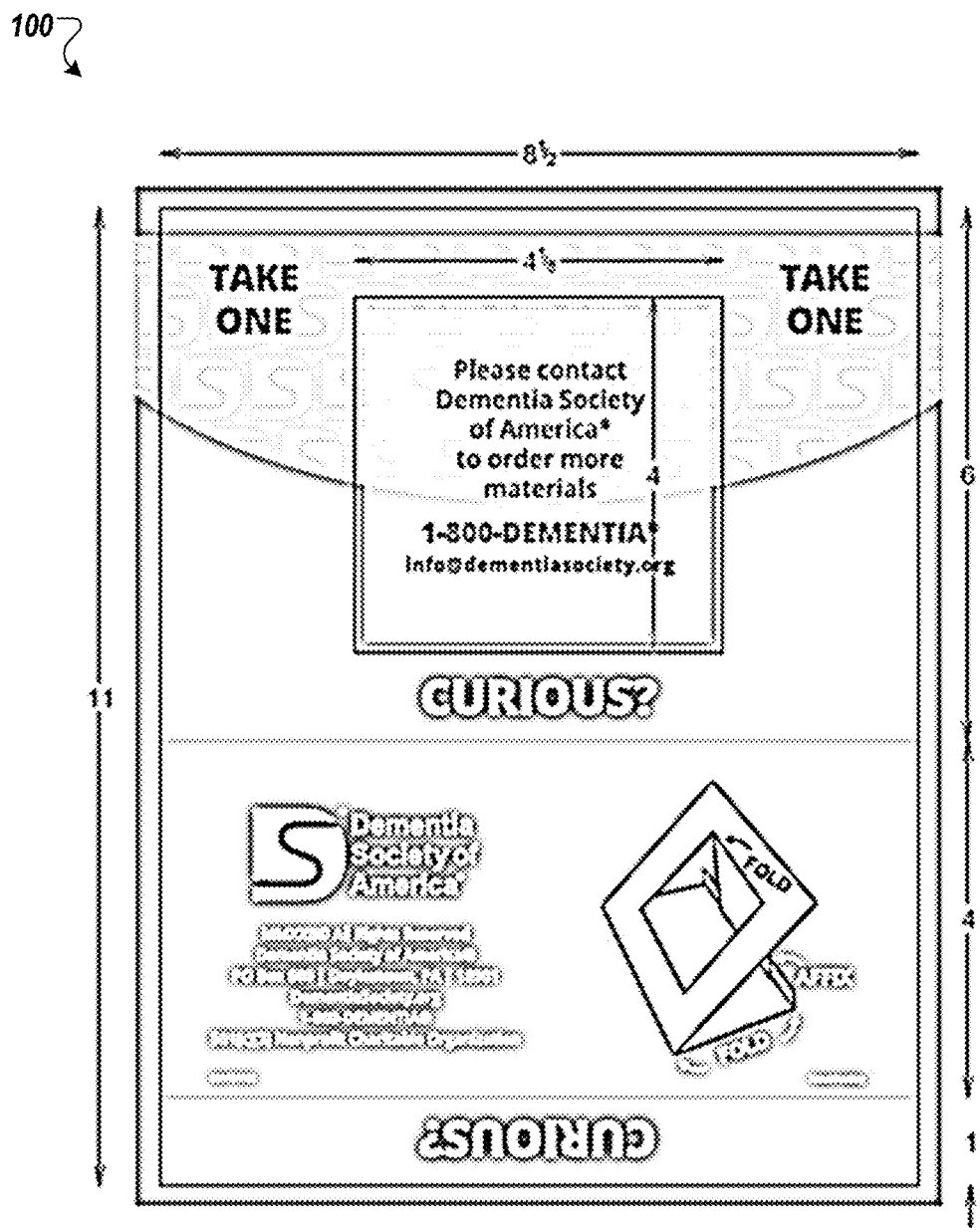
FIG. 2 illustrates an example of a front view of the apparatus shown in FIG. 1.

FIG. 2 illustrates an example of a front view of the apparatus 100 shown in FIG. 1. The front view is illustrated with example measurements for various features of the apparatus 100. In some examples, the apparatus 100 is sized to have a width of 8.5 inches and a height of 11 inches. In some examples, the first portion 102 of the apparatus 100 is sized to have a width of 8.5 inches and a length of 6 inches, while the second portion 104 is sized to have a width of 8.5 inches and a length of 5 inches. In some examples, the protruding region 104B is sized to have a width of 8.5 inches and a length of 1 inch. In some examples, the apparatus 100 is also designed to be printable and mailable in a standard-sized envelope.

In some examples, the apparatus 100 is printed using single or multi-color techniques. In some examples, the apparatus 100 has messaging viewable from its respective front and rear views. In some examples, the apparatus 100 is constructed to be low cost and lightweight. In some examples, the apparatus 100 is designed to be constructed to be friendly for Environmental, Social, and Governance (ESG) criteria. In some examples, the apparatus 100 is constructed from cardboard paper.

Figure 3:
FIG. 3 illustrates an example of a photograph of the apparatus shown in FIG. 1.
Figure 4:
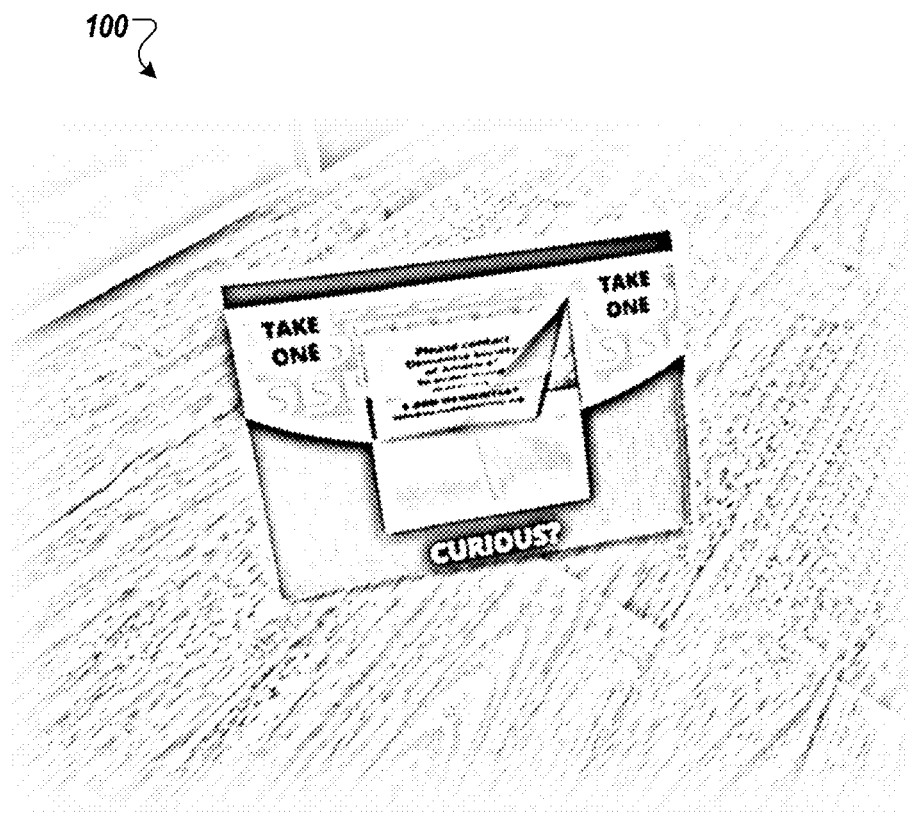
FIG. 4 illustrates an example of a photograph of the apparatus shown in FIG. 1.

FIG. 3 illustrates a first example of a photograph of the apparatus 100 shown in FIG. 1. FIG. 4 illustrates a second example of a photograph of the apparatus 100 shown in FIG. 1. In some examples, and as illustrated in FIGS. 3 and 4, the apparatus 100 is designed to hold printed materials 302 in the recess 115 (shown in FIG. 1). In some examples, the boundaries 115a, 115b, 115c, 115d (shown in FIG. 1) that define the recess 115 are sized in a specific fashion. For example, the first boundary 115a and the third boundary 115c can be sized to have a length of 4.125 inches, and the second boundary 115b and the fourth boundary 115d can be sized to have a length of 4 inches. In some examples, the sizing of the recess 115 provides the apparatus 100 with desirable properties, for example, allowing the apparatus 100 to hold printed materials 302 in such a way that it is resistant to being knocked over or tilted when struck.

While terms such as "first," "second," and so on, are used in this specification to describe certain components, other component naming conventions that accurately describe the claimed structure are acceptable. For example, first boundary 115a could be renamed as the "second" boundary, with second boundary 115b renamed as the "first" boundary. In this example, the "second" boundary would possess the features of the first boundary 115a recited in the specification. Other examples of alternative component names are possible.

What is claimed is:

1. An apparatus for retaining printed material comprising:
a foldable body having a first portion and a second portion, wherein:
the first portion is configured to be folded relative to the second portion to define a first fold extending along a lateral axis of the foldable body;
the first portion having a least:
a rectangular region having an area defined by four points within the first portion, wherein:
a first boundary of the rectangular region extends from a first point to a second point,
a second boundary extends from the second point to a third point,
a third boundary extends from third point to a fourth point,
a fourth boundary extends from fourth point to the first point, and
wherein the second boundary, third boundary, and the fourth boundary are each configured to define incisions in the first portion such that the first boundary is permitted to be folded relative to a remaining area of the first portion to define a second fold extending along the lateral axis;
the second portion having a least a base region and a protruding region, wherein the protruding region is folded relative to the base region to define a third fold extending along the lateral axis; and
wherein, when the first boundary is folded relative to the remaining area of the first portion, the third fold is configured to receive an end defined by the first boundary and thereby provide a recess in the first portion corresponding to the area of the rectangular region.

2. The apparatus of claim 1, wherein:
the protruding region extends in a first longitudinal axis;
the base region extends in a second longitudinal axis, and
the first longitudinal axis is perpendicular to the second longitudinal axis; and
the first longitudinal axis and the second longitudinal axis are each perpendicular to the lateral axis.

3. The apparatus of claim 1, wherein the apparatus is constructed from cardboard paper.

4. The apparatus of claim 1, wherein the apparatus is sized to have a width of 8.5 inches and a length of 11 inches.

5. The apparatus of claim 1, wherein the apparatus is sized such that:
   a length of the first portion is 6 inches and a width of the first portion is 8.5 inches; and
   a length of the second portion is 5 inches and a width of the first portion is 8.5 inches.

6. The apparatus of claim 5, wherein the apparatus is sized such that a length of the protruding region is 1 inch and the width of the protruding region is 8.5 inches.

7. The apparatus of claim 6, wherein the rectangular region such that:
   the first boundary and the third boundary have a length of 4.125 inches; and
   the second boundary and the fourth boundary have a length of 4 inches.

8. The apparatus of claim 1, wherein the apparatus is configured to hold the printed material by holding the printing material in the recess.

9. The apparatus of claim 1, wherein, when the first boundary is folded relative to the remaining area of the first portion, the third fold is configured to be affixed to the end defined by the first boundary.

\* \* \* \* \*